(12) United States Patent
Cui et al.

(10) Patent No.: US 10,754,099 B2
(45) Date of Patent: Aug. 25, 2020

(54) OPTICAL FIBER ADAPTER

(71) Applicant: ADVANCED-CONNECTEK INC., New Taipei (TW)

(72) Inventors: Yang-Yang Cui, New Taipei (TW); Gui-Hua Wen, New Taipei (TW)

(73) Assignee: ADVANCED-CONNECTEK INC., New Taipei (TW)

( * ) Notice: Subject to any disclaimer, the term of this patent is extended or adjusted under 35 U.S.C. 154(b) by 0 days.

(21) Appl. No.: 16/211,838

(22) Filed: Dec. 6, 2018

(65) Prior Publication Data

US 2019/0170948 A1    Jun. 6, 2019

(30) Foreign Application Priority Data

Dec. 6, 2017  (CN) ...................... 2017 2 1680041 U

(51) Int. Cl.
*G02B 6/36*  (2006.01)
*G02B 6/38*  (2006.01)

(52) U.S. Cl.
CPC ......... *G02B 6/3825* (2013.01); *G02B 6/3897* (2013.01); *G02B 6/3849* (2013.01)

(58) Field of Classification Search
CPC ... G02B 6/3825; G02B 6/3897; G02B 6/3849
USPC ........ 385/53, 60, 62, 65, 66, 72, 81, 83, 84, 385/92, 94
See application file for complete search history.

(56) References Cited

U.S. PATENT DOCUMENTS

| | | | | |
|---|---|---|---|---|
| 5,076,656 A | * | 12/1991 | Briggs ................. | G02B 6/3807 385/60 |
| 5,937,121 A | * | 8/1999 | Ott ....................... | G02B 6/3825 385/59 |
| 2014/0050443 A1 | * | 2/2014 | Lee ...................... | G02B 6/3879 385/77 |
| 2017/0315305 A1 | * | 11/2017 | Sanders ............... | G02B 6/3825 |
| 2018/0267243 A1 | * | 9/2018 | Nhep ..................... | G02B 6/38 |

* cited by examiner

*Primary Examiner* — Kaveh C Kianni
*Assistant Examiner* — Hung Q Lam
(74) *Attorney, Agent, or Firm* — Muncy, Geissler, Olds & Lowe, P.C.

(57) ABSTRACT

An optical fiber adapter includes housing, a base body, an occluder, and optical fiber components. A first end surface of the housing includes an insertion opening. A second end surface of the housing includes a connection opening. A through groove is in the housing, and the insertion opening communicates with the connection opening through the through groove. The first end surface includes positioning portions around a periphery of the insertion opening. A hook portion is extending outwardly from the positioning portion. The base body is in the through groove of the housing. The occluder is connected to the partition plate. The optical fiber component is at the assembling portion. The housing of the optical fiber adapter does not have the protruding portions. Hence, several optical fiber adapters can be densely arranged side-by-side. Therefore, the number of the adapters arranged in the optical fiber cassette can be increased.

19 Claims, 7 Drawing Sheets

OPTICAL FIBER ADAPTER

CROSS-REFERENCE TO RELATED APPLICATION

This non-provisional application claims priority under 35 U.S.C. § 119(a) to Patent Application No. 201721680041.5 filed in China, P.R.C. on Dec. 6, 2017, the entire contents of which are hereby incorporated by reference.

FIELD OF THE INVENTION

The instant disclosure relates to an adapter, and more particular to an optical fiber adapter.

BACKGROUND

In the optical fiber fields, signals are in pairs and matched with each other, one for transmitting, and one for receiving. Optical transmission tools for optical fibers may be used to connect several short optical fibers with each other to form a long optical fiber. The optical transmission tools may be also used for connecting the optical fiber to an active component, e.g., a light source or a detector, or to a passive component, e.g., a light switch or an attenuator.

In an optical fiber connector known to the inventor, the fiber core of the optical fiber can be coupled with the optical path of a connecting component. Hence, the optical fiber is detachably inserted into an adapter. In order to prevent dusts entering into the adapter to damage or affect the optical fiber inside the adapter when the adapter is not plugged by the connector, a shielding piece is provided and pivotally connected to the adapter.

SUMMARY OF THE INVENTION

A plurality of optical fiber receiving boxes is placed in an optical fiber cabinet. The optical fiber receiving box has a limited space. Each of the optical fiber receiving boxes comprises several optical fiber cassettes and a plurality of optical fiber adapters assembled at one end of each of the optical fiber cassettes. In an optical fiber adapter known to the inventor, protruding portions are protruding from two sides of the housing of the adapter. When the optical fiber adapters are arranged in a side-by-side manner, the protruding portions are pushed against each other. Since the two protruding portions at two sides of the housing of the adapter occupy certain spaces, the maximum number for the adapters connectable to the optical fiber cassette is reduced. For instance, in the case that the maximum number for the adapters connectable to one optical fiber cassette is three and each adapter has four grooves for being inserted by the optical fiber plug connectors, twelve optical fiber plug connectors can be inserted into the grooves of the adapters. However, since the protruding portions at two sides of the housing of the adapter already occupy certain spaces, the optical fiber cassette cannot be connected to more adapters.

An embodiment of the instant disclosure provides an optical fiber adapter comprising a housing, a base body, an occluder, and a plurality of optical fiber components. A first end surface of the housing comprises an insertion opening. A second end surface of the housing comprises a connection opening. A through groove is in the housing, and the insertion opening communicates with the connection opening through the through groove. The first end surface comprises a plurality of positioning portions around a periphery of the insertion opening. A hook portion is outwardly extending from each of the positioning portions. The base body is in the through groove of the housing. One of two ends of the base body comprises a partition plate in the through groove, and the other end of the base body comprises a plurality of assembling portions out of the through groove. Each of the assembling portions comprises an optical channel. The occluder is connected to the partition plate. Two sides of the occluder respectively comprise an elastic sheet extending toward a side portion of the partition plate. Each of the optical fiber components is at the corresponding assembling portion. Each of the optical fiber components comprises a sleeve tube inserted into the corresponding optical channel, a core tube in the sleeve tube, and an elastic member in the sleeve tube and out of the core tube. Each of the optical fiber components comprises an insertion core connected to one end of the corresponding core tube and extending toward an inner side of the corresponding optical channel.

In one embodiment, each of the assembling portions comprises an engaging groove, and an engaging block is protruding from an outer surface of each of the sleeve tubes for engaging with the corresponding engaging groove.

In one embodiment, a buckling groove is on the outer surface of each of the sleeve tubes, and a buckling block is protruding from an outer surface of each of the core tubes for mating with the corresponding buckling groove.

In one embodiment, a plurality of ribs is protruding from the outer surface of each of the sleeve tubes.

In one embodiment, each of the hook portions comprises a suspended arm formed on the first end surface and a protruding block outwardly extending from an end portion of the suspended arm.

In one embodiment, each of the optical fiber components comprises an extension tube connected to one end of the corresponding insertion core.

In one embodiment, each of the optical fiber components comprises a stopping ring fitted over the corresponding extension tube.

In one embodiment, a stopping block is protruding from each of the stopping rings, and each of the assembling portions comprises a stopping groove for mating with the corresponding stopping block.

In one embodiment, the optical fiber adapter further comprises a dustproof lid covering the connection opening.

In one embodiment, the first end surface of the housing comprises four positioning portions, two of the positioning portions are at an upper portion of the housing and above the insertion opening, and the other two positioning portions are at a lower portion of the housing and below the insertion opening. The hook portions of the two positioning portions at the upper portion of the housing are extending outwardly along a direction, and the hook portions of the two positioning portions at the lower portion of the housing are extending outwardly along a direction.

As above, according to one or some embodiments of the instant disclosure, the housing of the dual-hole type optical fiber adapter does not have the protruding portions. Hence, several optical fiber adapters can be seamlessly and densely arranged in a side-by-side manner. Therefore, the number of the adapters arranged in the optical fiber cassette can be increased. The center distance of each of the optical fiber adapters is shortened to 6.25 mm. Therefore, one hundred and ninety-two optical fiber cores can be provided by the dual-hole type LC (lucent connector) adapters assembled in the optical fiber receiving box. Furthermore, the optical fiber component is a plastic inner core formed integrally. Hence, one of two ends of the optical fiber component can be provided for guiding the adapter and the other end of the optical fiber component can be provided for mating with the connector. The optical fiber component has an adapter functional end, and the adapter functional end has asymmetrical guiding grooves in different widths. Therefore, the assembling and disassembling of the connector can be achieved in a convenient and easy manner. Moreover, the housing of the dual-hole type optical fiber adapter is provided with positioning portions for assembling on the optical fiber cassette conveniently.

BRIEF DESCRIPTION OF THE DRAWINGS

The instant disclosure will become more fully understood from the detailed description given herein below for illustration only, and thus not limitative of the instant disclosure, wherein.

DETAILED DESCRIPTION

Detailed description of the characteristics and the advantages of the instant disclosure are shown in the following embodiments. The technical content and the implementation of the instant disclosure should be readily apparent to any person skilled in the art from the detailed description, and the purposes and the advantages of the instant disclosure should be readily understood by any person skilled in the art with reference to content, claims, and drawings in the instant disclosure.

Figure 1:
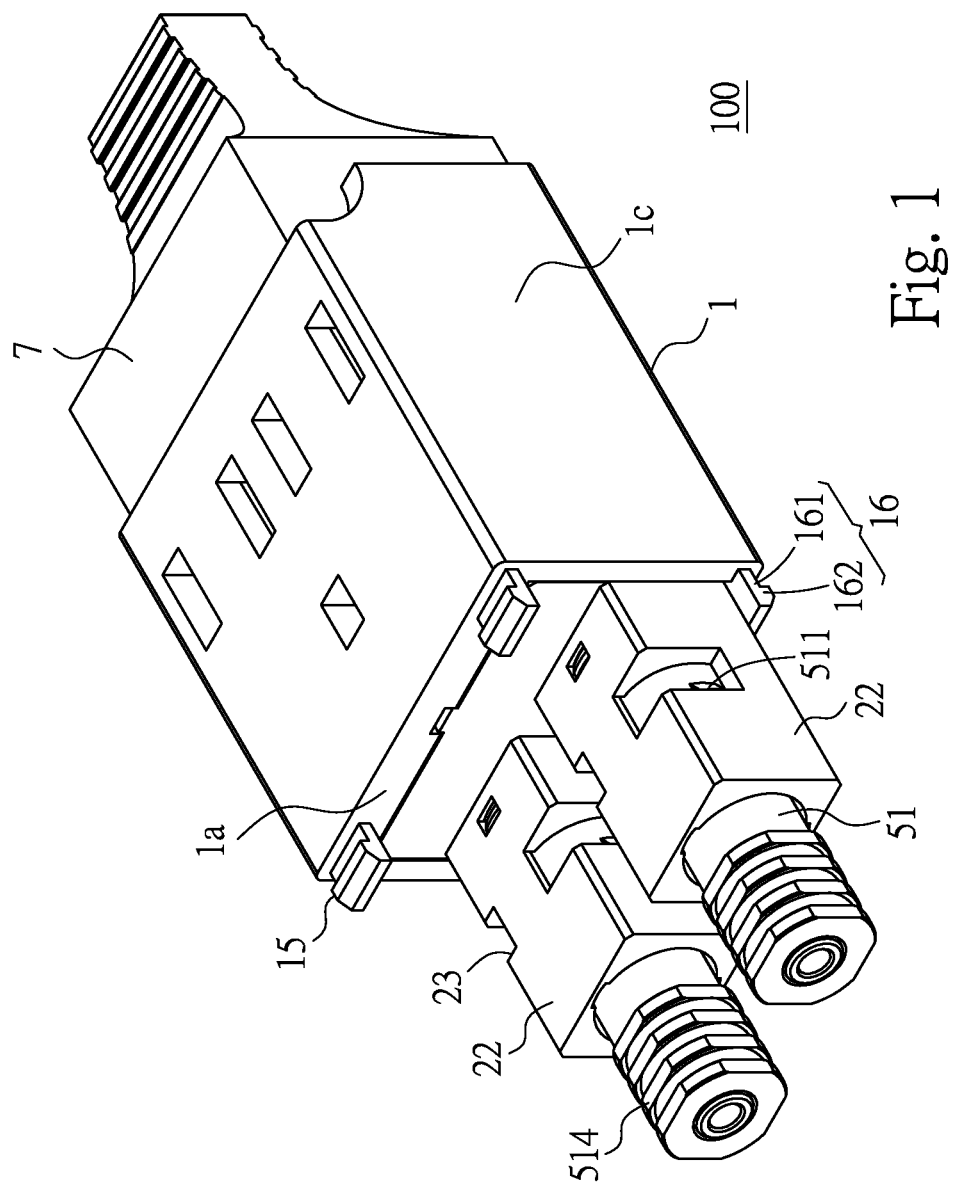
FIG. 1 illustrates a perspective view of an optical fiber adapter according to an exemplary embodiment of the instant disclosure.
Figure 2:
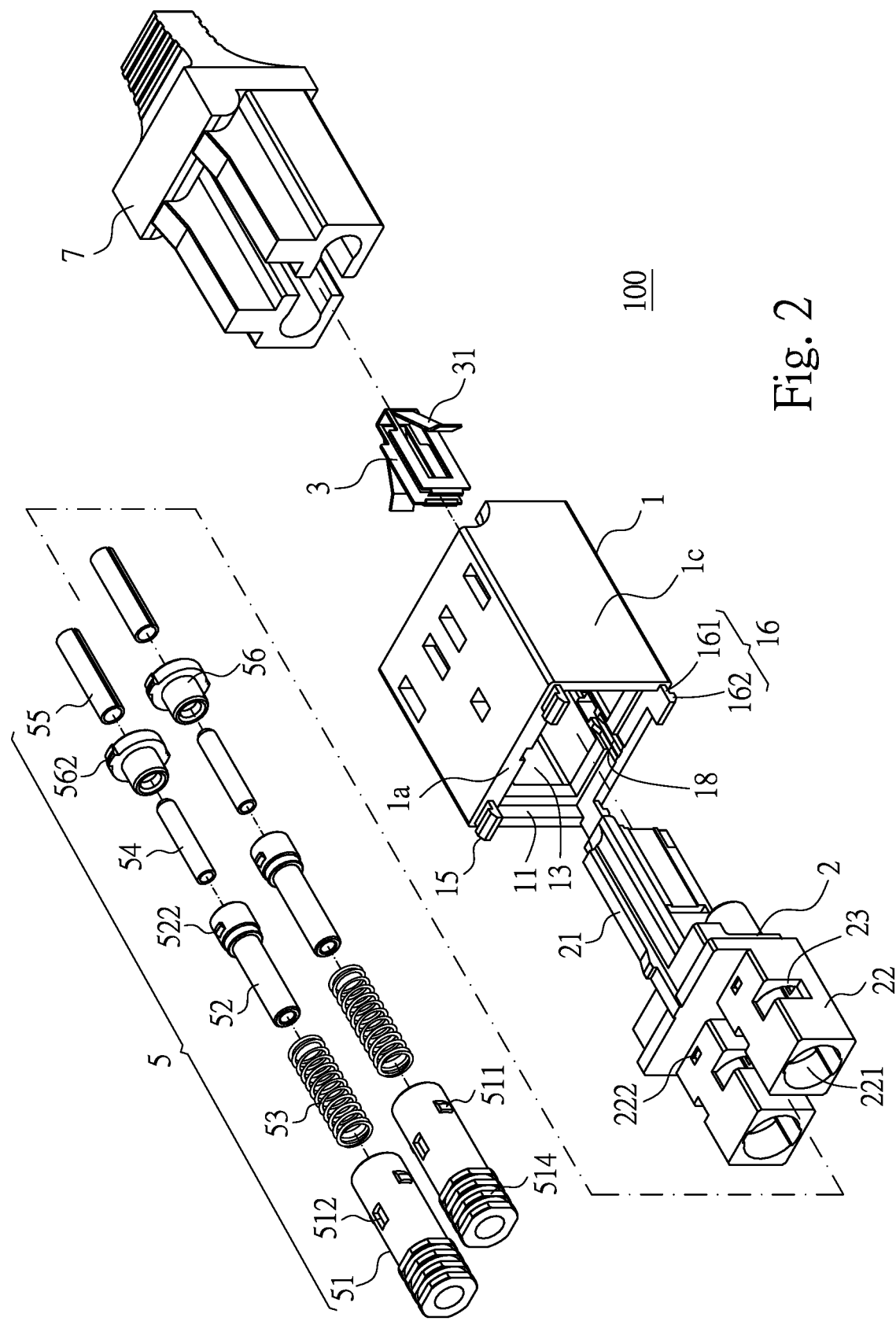
FIG. 2 illustrates an exploded view (1) of the optical fiber adapter of the exemplary embodiment.
Figure 3:
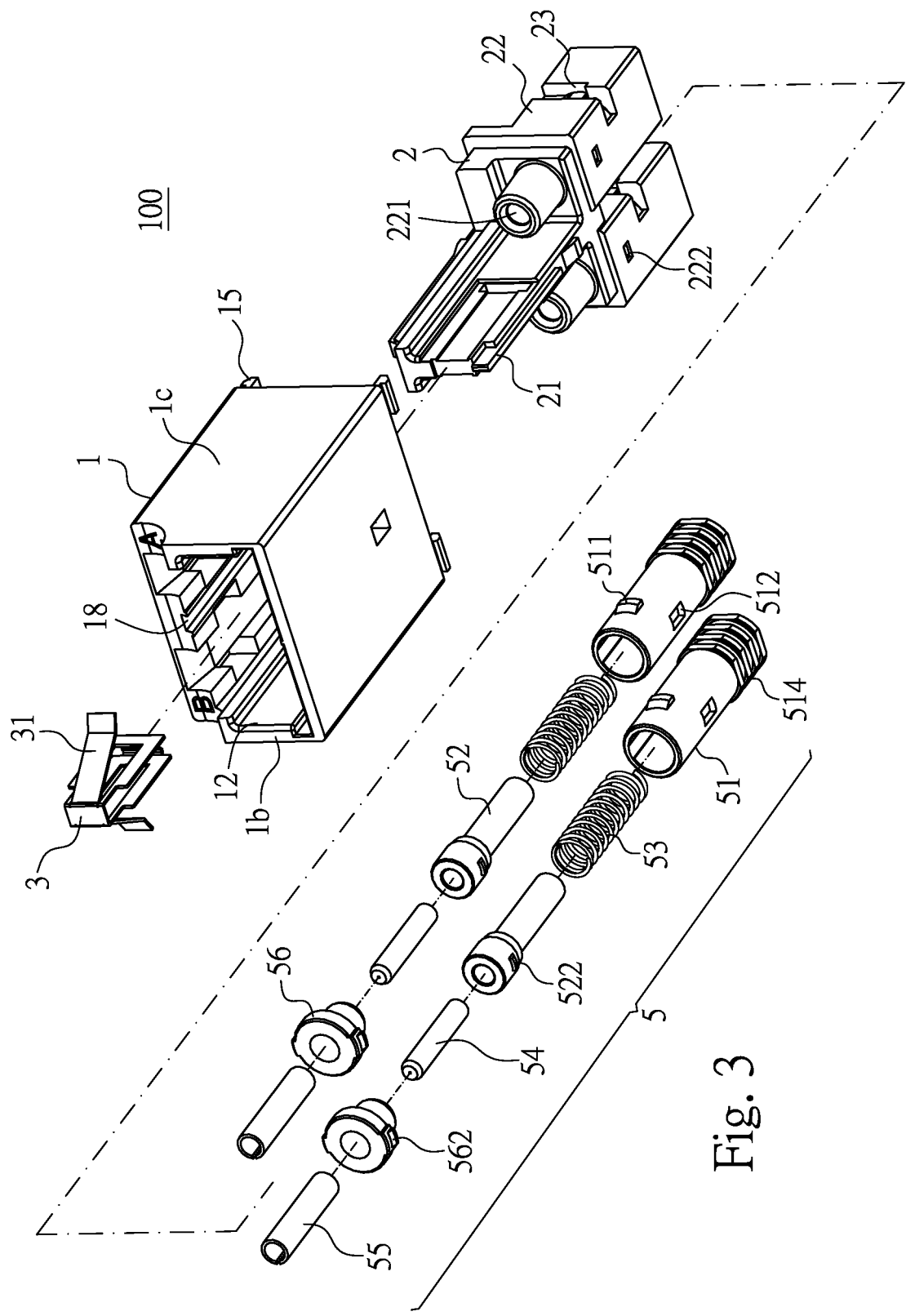
FIG. 3 illustrates an exploded view (2) of the optical fiber adapter of the exemplary embodiment.
Figure 4:
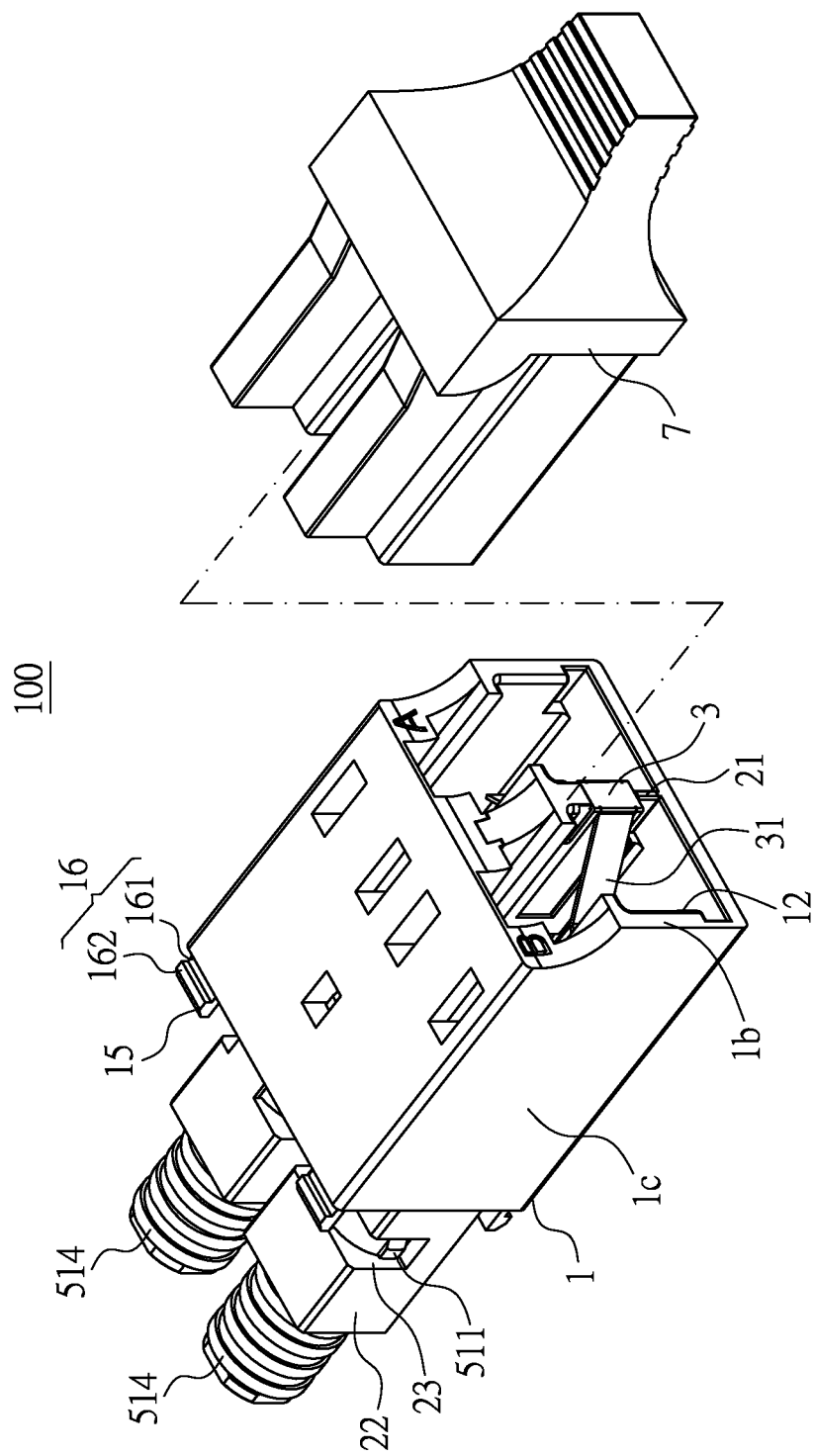
FIG. 4 illustrates an exploded view showing that a dustproof lid is detached from a housing, according to the optical fiber adapter of the exemplary embodiment.
Figure 5:
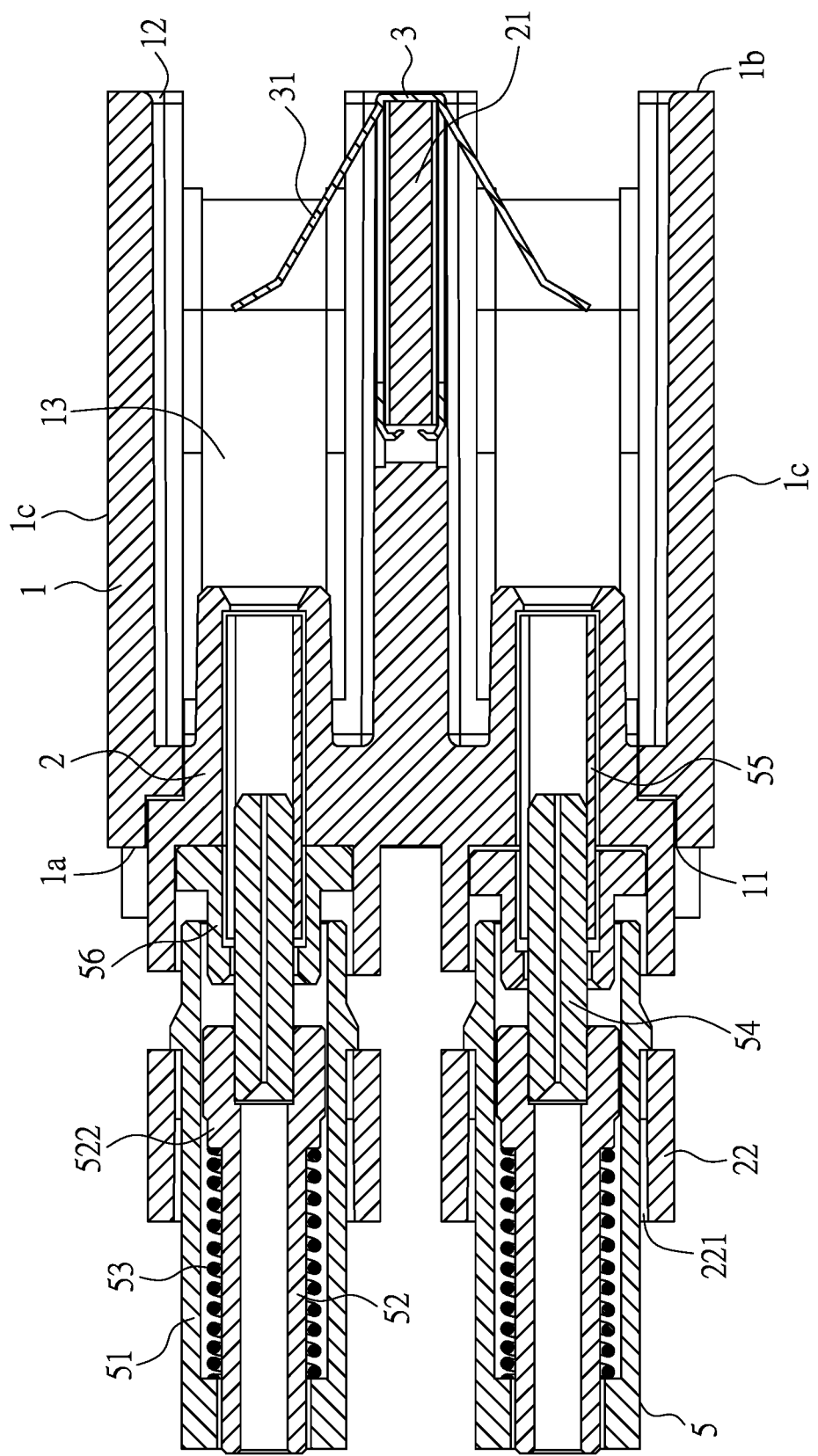
FIG. 5 illustrates a top sectional view of the optical fiber adapter of the exemplary embodiment.
Figure 6:
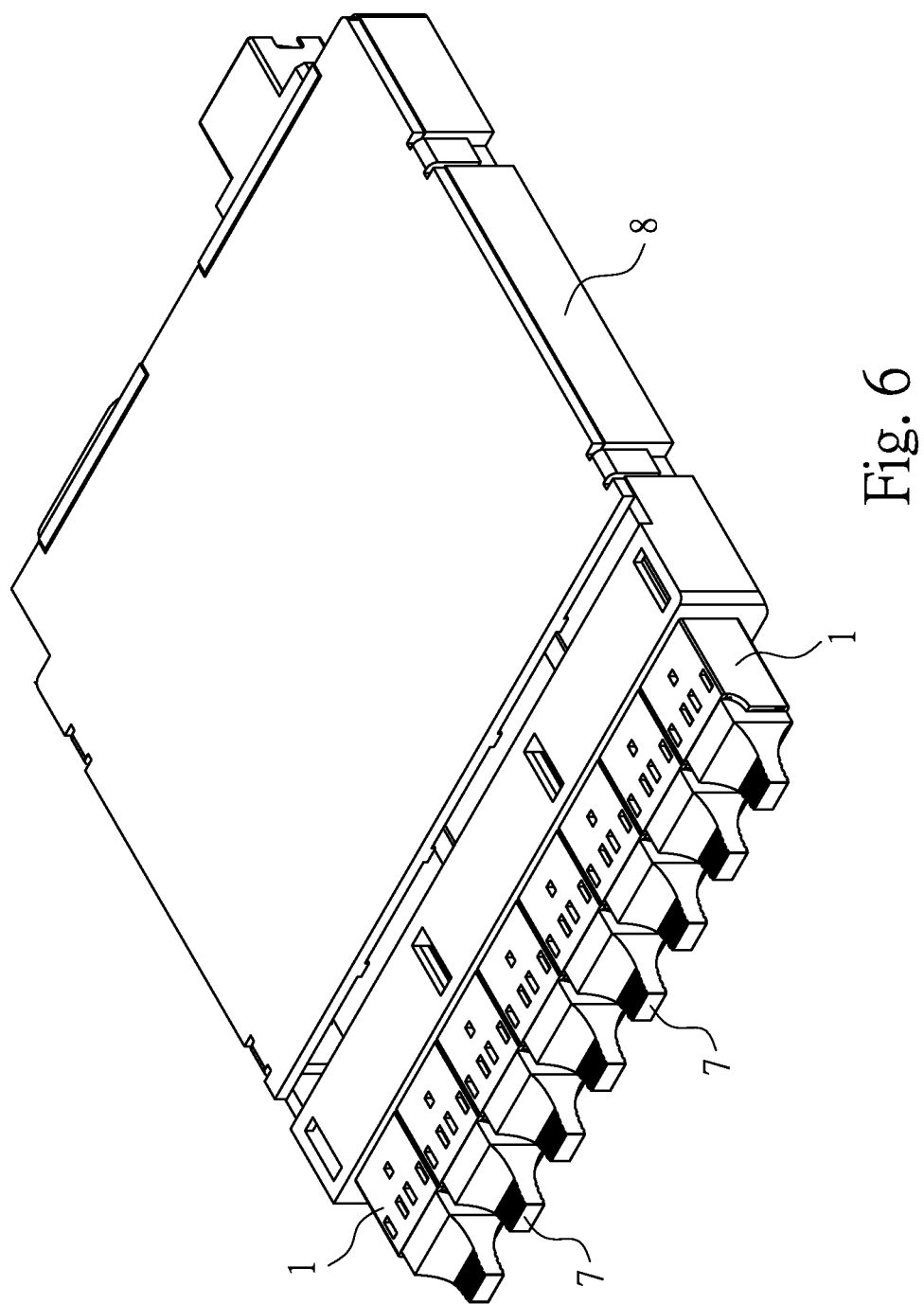
FIG. 6 illustrates a perspective view showing that several optical fiber adapters of the exemplary embodiment are assembled with an optical fiber cassette.
Figure 7:
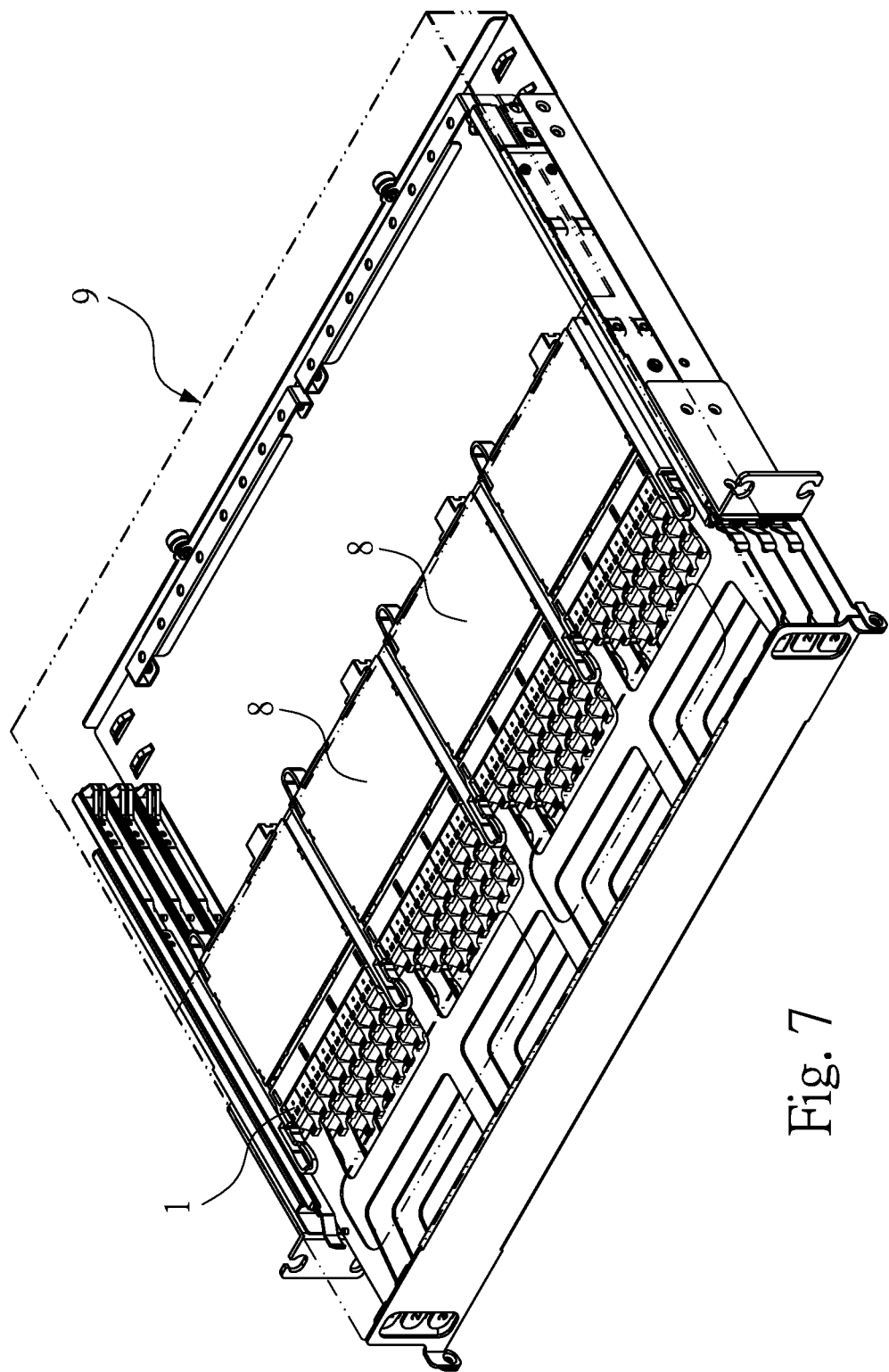
FIG. 7 illustrates a perspective view showing that several optical fiber adapters of the exemplary embodiment are assembled in an optical fiber receiving box.

Please refer to FIGS. 1 to 7, illustrating an optical fiber adapter 100 of an exemplary embodiment according to the instant disclosure. FIG. 1 illustrates a perspective view of the optical fiber adapter 100 of the exemplary embodiment. FIG. 2 illustrates an exploded view (1) of the optical fiber adapter 100 of the exemplary embodiment. FIG. 3 illustrates an exploded view (2) of the optical fiber adapter 100 of the exemplary embodiment. FIG. 4 illustrates an exploded view showing that a dustproof lid 7 is detached from a housing 1, according to the optical fiber adapter 100 of the exemplary embodiment. FIG. 5 illustrates a top sectional view of the optical fiber adapter 100 of the exemplary embodiment. FIG. 6 illustrates a perspective view showing that several optical fiber adapters 100 of the exemplary embodiment are assembled with an optical fiber cassette 8. FIG. 7 illustrates a perspective view showing that several optical fiber adapters 100 of the exemplary embodiment are assembled in an optical fiber receiving box 9. In this embodiment, the optical fiber adapter 100 is provided for being inserted by several optical connectors (not shown). Further, several optical fiber adapters 100 can be connected to one end of an optical fiber cassette 8, and several optical fiber cassettes 8 can be assembled in an optical fiber receiving box 9 in a dense manner. Therefore, one hundred and ninety-two, i.e., 192, optical fiber cores, having a diameter of 0.9 mm, can be assembled in the optical fiber receiving box (while in the case known to the inventor, one hundred and forty-four, i.e., 144, optical fiber cores can be assembled in an optical fiber receiving box). In this embodiment, the optical fiber adapter 100 comprises a housing 1, a base body 2, a shielding piece 3, and a plurality of optical fiber components 5.

Please refer to FIGS. 1 to 5. In this embodiment, the housing 1 is a hollowed shell in rectangular shape. A first end surface 1a of the housing 1 (the front portion) comprises an insertion opening 11, and a second end surface 1b of the housing 1 (the rear portion) comprises a connection opening 12. A through groove 13 is in the housing 1, and the insertion opening 11 communicates with the connection opening 12 through the through groove 13. Lateral surfaces 1c at two sides of the housing 1 are flat surfaces and parallel with each other.

Please refer to FIGS. 1 to 6. In this embodiment, the first end surface 1a comprises a plurality of positioning portions 15 around a periphery of the insertion opening 11. Each of the positioning portions 15 forms a hook-shape structure. The positioning portions 15 are extending outwardly along a direction perpendicular to the first end surface 1a. A hook portion 16 is extending outwardly from each of the positioning portions 15. In this embodiment, the first end surface 1a of the housing 1 comprises four positioning portions 15. Two of the positioning portions 15 are at an upper portion of the housing 1 and above the insertion opening 11, and the other two positioning portions 15 are at a lower portion of the housing 1 and below the insertion opening 11. Hence, the four positioning portions 15 of the housing 1 can be stably positioned in grooves of the optical fiber cassette 8 to ensure the housing 1 to be positioned and limited in the vertical direction.

Please refer to FIGS. 1 to 6. In this embodiment, each of the hook portions 16 comprises a suspended arm 161 formed on the first end surface 1a and a protruding block 162 outwardly extending from an end portion of the suspended arm 161. From a lateral view, the cross section of the suspended arm 161 and the protruding block 162 are L-shaped. The suspended arm 161 allows the hook portion 16 to be flexibly swingable. When the protruding blocks 162 are to be engaged in the groove of the optical fiber cassette 8, the protruding blocks 162 firstly contact peripheral surfaces around the groove and drive the suspended arms 161 to swing. Then, when the protruding blocks 162 are in the groove, the suspended arms 161 drive the protruding blocks 162 to be engaged with inner surfaces of the groove. In this embodiment, the protruding blocks 162 are provided with chamfered angles, and the chamfered angles guide the housing 1 to be assembled in the groove of the optical fiber cassette 8 smoothly.

Please refer to FIGS. 1 to 5. In this embodiment, the hook portions 16 of the two positioning portions 15 at the upper portion of the housing 1 are extending outwardly along a direction, and the hook portions 16 of the two positioning portions 15 at the lower portion of the housing 1 are extending outwardly along a direction. Namely, the protruding blocks 162 of the two hook portions 16 at the upper portion of the housing 1 are extending upwardly, and the protruding blocks 162 of the two hook portions 16 at the lower portion of the housing 1 are extending downwardly. Furthermore, the hook portion 16 of each of the positioning portions 15 is extending outwardly from the first end surface 1a, instead of protruding out of the lateral surfaces 1c of the housing 1. Hence, when the housings 1 of several optical fiber adapters 100 are arranged in a side-by-side manner, the hook portions 16 of the housings 1 are not pushed against each other.

Please refer to FIGS. 1 to 5. In this embodiment, the housing 1 comprises a rail 18 at an inner surface of the through groove 13. The optical fiber adapter 100 comprises the base body 2 mated with the rail 18 and positioned in the housing 1. After the base body 2 is mated with the rail 18, the base body 2 can be stably positioned in the housing 1. Hence, such assembling procedure can be achieved in an easy and fast manner.

Please refer to FIGS. 1 to 5. In this embodiment, the base body 2 is a plastic block approximately in T-shaped, and the base body 2 is assembled in the through groove 13 of the housing 1. One of two ends of the base body 2 comprises a partition plate 21 in the through groove 13. The partition plate 21 separates the through groove 13 into two spaces. The other end of the base body 2 comprises a plurality of assembling portions 22 out of the through groove 13. Each of the assembling portions 22 forms a hollowed receiving groove. Each of the assembling portions 22 comprises an optical channel 221. A side sheet is formed between the assembling portions 22 and the partition plate 21 for covering the insertion opening 11.

Please refer to FIGS. 1 to 5. In this embodiment, the occluder 3 is a metallic sheet and is bent to be of an arrow shape. The occluder 3 is connected to an end portion of the partition plate 21. Two sides of the occluder 3 respectively comprise an elastic sheet 31 slantingly extending toward a side portion of the partition plate 21. The two elastic sheets 31 are slantingly extending from a center portion of the connection opening 12 toward inner sides of the through groove 13. When a plug connector of an optical fiber connector (not shown) is not inserted into the housing 1, the elastic sheets 31 are in an expanded state to shield the light in the optical channel 221 and to prevent the light from the optical fiber component 5 entering into the user's eyes. Conversely, when the plug connector of the optical fiber connector is inserted into the housing 1, the plug connector pushes against the elastic sheets 31, and the elastic sheets 31 are in a compressed state. Therefore, the light in the optical channel 221 is not shielded and the light from the optical fiber component 5 can be transmitted to the optical fiber connector.

Please refer to FIGS. 1 to 5. In this embodiment, each of the optical fiber components 5 is at the corresponding assembling portion 22. Each of the optical fiber components 5 comprises a sleeve tube 51 inserted into the corresponding optical channel 221, a core tube 52 in the sleeve tube 51, and an elastic member 53 in the sleeve tube 51 and out of the core tube 52. Two ends of each of the elastic members 5 are respectively abutted against the sleeve tube 51 and the core tube 52. Each of optical fiber components 5 comprises an insertion core 54 connected to one end of the corresponding core tube 52 and extending toward an inner side of the corresponding optical channel 221. In this embodiment, each of the optical fiber components 5 comprises an extension tube 55 connected to one end of the corresponding insertion core 54. Furthermore, each of the optical fiber components 5 comprises a stopping ring 56 fitted over the corresponding extension tube 55.

Please refer to FIGS. 1 to 5. In this embodiment, a stopping block 562 is protruding from each of the stopping rings 56. Each of the assembling portions 22 comprises a stopping groove 222 for mating with the corresponding stopping block 562. Therefore, the extension tube 55 can be positioned with the insertion core 54 by positioning the stopping block 562 in the stopping groove 222.

Please refer to FIGS. 1 to 5. In this embodiment, each of the assembling portions 22 is a post structure, and a side wall of each of the assembling portions 22 comprises an engaging groove 23. An engaging block 511 is protruding from an outer surface of each of the sleeve tubes 51. When each of the sleeve tubes 51 is inserted into the optical channel 221 of the corresponding assembling portion 22, the engaging block 511 of each of the sleeve tubes 51 is mated with the corresponding engaging groove 23. Furthermore, the engaging blocks 511 have chamfered angles, and the chamfered angles guide the sleeve tubes 51 to be inserted into the optical channels 221 of the assembling portions 22 smoothly.

Please refer to FIGS. 1 to 5. In this embodiment, a buckling groove 512 is on the outer surface of each of the sleeve tubes 51, and a buckling block 522 is protruding from an outer surface of each of the core tubes 52 for mating with the corresponding buckling groove 512. The buckling blocks 522 have chamfered angles, and the chamfered angles guide the buckling blocks 522 to be buckled with the buckling grooves 512 smoothly. The engaging block 511 and the buckling block 522 are located at different portions of the peripheral portion of the optical fiber component 5, and the orientation of the chamfered angles of the engaging blocks 511 and the orientation of the chamfered angles of the buckling block 522 are different. The engaging block 511 and the buckling block 522 have different widths. The engaging blocks 511 and the buckling blocks 522 are provided for engaging parts of the optical fiber component 5 with each other.

Please refer to FIGS. 1 to 5. In this embodiment, a plurality of ribs 514 is protruding from the outer surface of each of the sleeve tubes 51. The optical fiber component 5 is a cylinder structure and has a reduced volume. The ribs 514 of the sleeve tube 51 provide a skid-proof function. Furthermore, the optical fiber component 5 can be assembled with the base body 2 easily by rotating the optical fiber component 5 to allow the engaging block 511 to be mated with the engaging groove 23.

In one embodiment, the optical fiber component 5 is a plastic inner core formed integrally. Hence, one of two ends of the optical fiber component 5 can be provided for guiding the adapter and the other end of the optical fiber component 5 can be provided for mating with the connector. The optical fiber component 5 has an adapter functional end, and the adapter functional end has asymmetrical guiding grooves in different widths. Therefore, the assembling and disassembling of the connector can be achieved in a convenient and easy manner.

Please refer to FIGS. 2 and 4. In this embodiment, the optical fiber adapter 100 further comprises a dustproof lid 7 covering the connection opening 12. When the plug connector of the optical fiber connector is to be inserted into the optical fiber adapter 100, the dustproof lid 7 can be detached from the housing 1, and then the plug connector of the optical fiber connector can be inserted into the connection opening 12.

As above, according to one or some embodiments of the instant disclosure, the housing of the dual-hole type optical fiber adapter does not have the protruding portions. Hence, several optical fiber adapters can be seamlessly and densely arranged in a side-by-side manner. Therefore, the number of the adapters arranged in the optical fiber cassette can be increased. The center distance of each of the optical fiber adapters is shortened to 6.25 mm. Therefore, one hundred and ninety-two optical fiber cores can be provided by the dual-hole type LC (lucent connector) adapters assembled in the optical fiber receiving box. Furthermore, the optical fiber component is a plastic inner core formed integrally. Hence, one of two ends of the optical fiber component can be provided for guiding the adapter and the other end of the optical fiber component can be provided for mating with the connector. The optical fiber component has an adapter functional end, and the adapter functional end has asymmetrical guiding grooves in different widths. Therefore, the assembling and disassembling of the connector can be achieved in a convenient and easy manner. Moreover, the housing of the dual-hole type optical fiber adapter is provided with positioning portions for assembling on the optical fiber cassette conveniently.

While the instant disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. An optical fiber adapter, comprising:
   a housing, wherein a first end surface of the housing comprises an insertion opening, a second end surface of the housing comprises a connection opening, a through groove is in the housing, and the insertion opening communicates with the connection opening through the through groove, the first end surface comprises a plurality of positioning portions around a periphery of the insertion opening, and a hook portion is extending outwardly from each of the positioning portions;
   a base body in the through groove of the housing, wherein one of two ends of the base body comprises a partition plate in the through groove, and the other end of the base body comprises a plurality of assembling portions out of the through groove, each of the assembling portions comprises an optical channel;
   a occluder connected to the partition plate, wherein two sides of the occluder respectively comprise an elastic sheet slantingly extending toward a side portion of the partition plate; and
   a plurality of optical fiber components respectively at the assembling portions, wherein each of the optical fiber components comprises a sleeve tube inserted into the corresponding optical channel, a core tube in the sleeve tube, and an elastic member in the sleeve tube and out of the core tube, wherein each of the optical fiber components comprises an insertion core connected to one end of the corresponding core tube and extending toward an inner side of the corresponding optical channel, wherein each of the optical fiber components comprises an extension tube connected to one end of the corresponding insertion core.

2. The optical fiber adapter according to claim 1, wherein each of the assembling portions comprises an engaging groove, and an engaging block is protruding from an outer surface of each of the sleeve tubes for engaging with the corresponding engaging groove.

3. The optical fiber adapter according to claim 2, wherein a buckling groove is on the outer surface of each of the sleeve tubes, and a buckling block is protruding from an outer surface of each of the core tubes for mating with the corresponding buckling groove.

4. The optical fiber adapter according to claim 1, wherein a plurality of ribs is protruding from an outer surface of each of the sleeve tubes.

5. The optical fiber adapter according to claim 1, wherein each of the hook portions comprises a suspended arm formed on the first end surface and a protruding block outwardly extending from an end portion of the suspended arm.

6. The optical fiber adapter according to claim 1, wherein each of the optical fiber components comprises a stopping ring fitted over the corresponding extension tube.

7. The optical fiber adapter according to claim 6, wherein a stopping block is protruding from each of the stopping rings, and each of the assembling portions comprises a stopping groove for mating with the corresponding stopping block.

8. The optical fiber adapter according to claim 1, further comprising a dustproof lid covering the connection opening.

9. The optical fiber adapter according to claim 1, wherein the first end surface of the housing comprises four positioning portions, two of the positioning portions are at an upper portion of the housing and above the insertion opening, and the other two positioning portions are at a lower portion of the housing and below the insertion opening, the hook portions of the two positioning portions at the upper portion of the housing are extending outwardly along a direction, and the hook portions of the two positioning portions at the lower portion of the housing are extending outwardly along a direction.

10. An optical fiber adapter, comprising:
    a housing, wherein a first end surface of the housing comprises an insertion opening, a second end surface of the housing comprises a connection opening, a through groove is in the housing, and the insertion opening communicates with the connection opening through the through groove, the first end surface comprises a plurality of positioning portions around a periphery of the insertion opening, the positioning portions are extending outwardly along a direction perpendicular to the first end surface, and a hook portion is extending outwardly from each of the positioning portions;
    a base body in the through groove of the housing, wherein one of two ends of the base body comprises a partition plate in the through groove, and the other end of the base body comprises a plurality of assembling portions out of the through groove, each of the assembling portions comprises an optical channel;
    a occluder connected to the partition plate, wherein two sides of the occluder respectively comprise an elastic sheet slantingly extending toward a side portion of the partition plate; and
    a plurality of optical fiber components respectively at the assembling portions, wherein each of the optical fiber components comprises a sleeve tube inserted into the corresponding optical channel, a core tube in the sleeve tube, and an elastic member in the sleeve tube and out of the core tube, wherein each of the optical fiber components comprises an insertion core connected to one end of the corresponding core tube and extending toward an inner side of the corresponding optical channel.

11. The optical fiber adapter according to claim 10, wherein each of the assembling portions comprises an engaging groove, and an engaging block is protruding from an outer surface of each of the sleeve tubes for engaging with the corresponding engaging groove.

12. The optical fiber adapter according to claim 11, wherein a buckling groove is on the outer surface of each of the sleeve tubes, and a buckling block is protruding from an outer surface of each of the core tubes for mating with the corresponding buckling groove.

13. The optical fiber adapter according to claim 10, wherein a plurality of ribs is protruding from an outer surface of each of the sleeve tubes.

14. The optical fiber adapter according to claim 10, wherein each of the hook portions comprises a suspended arm formed on the first end surface and a protruding block outwardly extending from an end portion of the suspended arm.

15. The optical fiber adapter according to claim 10, wherein each of the optical fiber components comprises an extension tube connected to one end of the corresponding insertion core.

16. The optical fiber adapter according to claim 15, wherein each of the optical fiber components comprises a stopping ring fitted over the corresponding extension tube.

17. The optical fiber adapter according to claim 16, wherein a stopping block is protruding from each of the stopping rings, and each of the assembling portions comprises a stopping groove for mating with the corresponding stopping block.

18. The optical fiber adapter according to claim 10, further comprising a dustproof lid covering the connection opening.

19. The optical fiber adapter according to claim 10, wherein the first end surface of the housing comprises four positioning portions, two of the positioning portions are at an upper portion of the housing and above the insertion opening, and the other two positioning portions are at a lower portion of the housing and below the insertion opening, the hook portions of the two positioning portions at the upper portion of the housing are extending outwardly along a direction, and the hook portions of the two positioning portions at the lower portion of the housing are extending outwardly along a direction.

* * * * *